INVENTORS.
Herbert L. Bone and
David P. Fitzsimmons
BY W. L. Stout.
THEIR ATTORNEY INVENTORS.
Herbert L. Bone and
David P. Fitzsimmons
BY W. L. Stout.
THEIR ATTORNEY Nov. 14, 1961     H. L. BONE ET AL     3,009,056
VEHICLE WEIGHING DEVICES Filed June 1, 1956     3 Sheets-Sheet 3

INVENTORS.
Herbert L. Bone and
David P. Fitzsimmons
BY W. L. Stout

THEIR ATTORNEY

United States Patent Office 3,009,056
Patented Nov. 14, 1961

3,009,056
VEHICLE WEIGHING DEVICES
Herbert L. Bone, Forest Hills, and David P. Fitzsimmons, Trafford, Pa., assignors to Westinghouse Air Brake Company, Wilmerding, Pa., a corporation of Pennsylvania
Filed June 1, 1956, Ser. No. 588,760
2 Claims. (Cl. 246—251)

Our invention relates to a vehicle weight responsive device, and particularly to a device mounted in a slot or opening formed in the web of a railway rail and responsive to the deflection of the portion of the rail above the slot as car wheels pass over the slot.

In certain forms of weight measuring devices previously used, deflection of the entire rail between two support points is measured and translated into weight readings. This arrangement has the disadvantage of requiring a very rigid support and rigid rail anchoring means. Other types of weight measuring devices which have been used require entire rail sections to be supported on scales or a portion of the railhead to be cut away to provide clearance for a weight responsive lever. The supporting of an entire rail section on scales requires an installation which is expensive to make and maintain and the cutting away of the head of the rail is objectionable due to the resulting break in the wheel rolling surface.

It is therefore an object of our invention to provide a novel weight measuring device capable of operation under small railhead deflections.

Another object of this invention is to provide a novel weight measuring device capable of low installation cost.

Still another object of our invention is to provide a novel weight measuring device capable of amplifying the small railhead deflection changes.

A further object of our invention is to provide a novel weight responsive device that is sufficiently compact to be contained within the area beneath the railhead.

Other objects, purposes and characteristic features of our invention will be in part obvious from the accompanying drawings and in part pointed out as the description of the invention progresses.

In the following description the slotted member may be referred to as a rail having an upper or first portion, an intermediate or second portion and a lower or third portion. However, it is to be understood that a rail is merely a particular type of beam member carrying a variable load.

Our invention is therefore not to be restricted to a rail but is applicable to any beam member.

In practicing our invention we provide a circuit controlling device located within a slot or opening provided in a web of a railroad rail or other load carrying device in a manner to be responsive to the deflection of the upper portion of the rail caused by a passing load. The circuit controlling device comprises sensing means such as strain gages arranged to amplify any deflection of the railhead or upper portion toward the bottom of the slot within the rail. The strain gage response may be used for any desired purpose, such, for example, as to provide weight information for use in automatically controlling the braking action of car retarders in a classification yard in accordance with the weight of the car.

The provision of a circuit controlling device which can be mounted in a slot or opening in an intermediate portion of a rail, in the manner indicated, eliminates the need for special and expensive rail supports. The type of circuit controlling device disclosed is also capable of being operated through small railhead deflections.

In describing our invention in detail, reference will be made to the accompanying drawings in which corresponding parts are generally identified by corresponding reference characters and in which.

Similar reference characters refer to similar parts in each of the several views.

Figure 1:
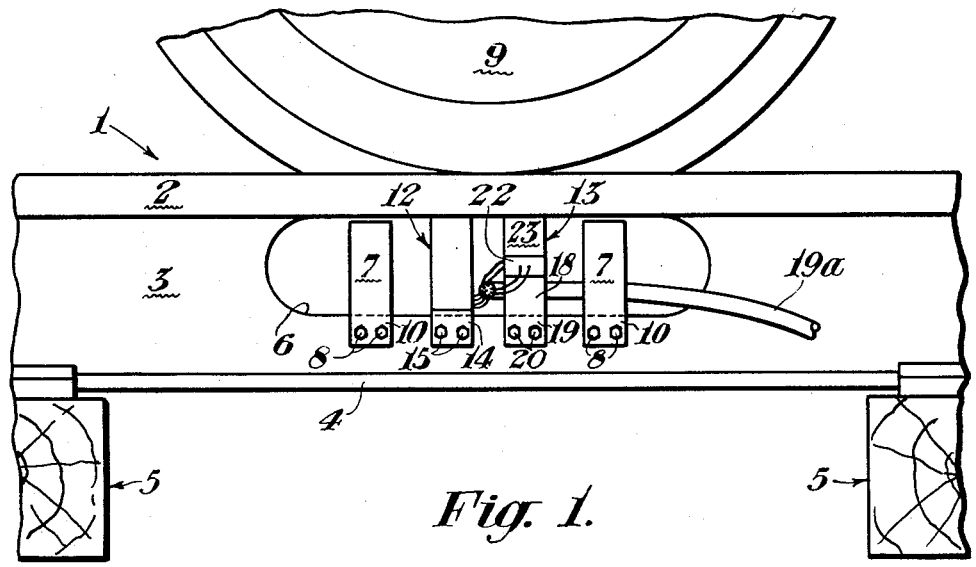
FIG. 1 is a side elevational view of our novel weight responsive circuit controlling device mounted in place in a rail slot in accordance with our invention.

We shall describe two forms of vehicle weighing means embodying our invention, and shall then point out the novel features thereof in claims.

In classification yards the need has arisen for a quick acting weight responsive circuit controlling device that will weigh a single car wheel passing over a desired location without the other wheels affecting the response. The need has arisen due to the use of automatic retarders in which it is necessary for initial retarder shoe pressure to be established according to the weight per wheel of a passing vehicle. Hence, a lightly loaded vehicle would receive a low initial retarder pressure while a heavy vehicle would receive a high initial retarder pressure.

Referring to the drawings, the reference character 1 designates a rail having an upper or first portion 2, an intermediate or second portion 3 and a lower or third portion 4, and which is supported on typical tie plates and ties 5.

Formed within the intermediate portion 3 of the rail 1 is an elongated opening such as a slot 6 which is positioned directly beneath the upper portion 2 of the rail 1. Inserted into the slot 6 is a pair of stop members 7 which, when secured in place by the bolts 8, seat firmly down against the bottom of the slot 6. The top of each of its stop members 7 is spaced from the lower surface of the upper portion 2 of the rail 1 a sufficient distance to allow deflection of the upper portion 2 into the slot 6 by a typical wheel 9 without exceeding the fatigue limit of the upper portion 2. The bolts 8 which secure the stop member 7 to the rail pass through clearance holes provided in the downwardly projecting lugs 10 formed on the lower ends of the stop members and through other clearance holes formed in the intermediate portion 3 of the rail 1.

Positioned within the slot 6 and between the stop members 7 is a pair of circuit controlling devices 12 and 13. The circuit controlling device 12 comprises an L-shaped metallic base 14 positioned with one leg lying horizontally across the base of the openings 6 and the other leg extending downwardly alongside the intermediate portion 3 of the rail 1. The downwardly extending leg of the L-shaped base 14 is provided with openings for receiving the securing bolts 15 which also pass through the intermediate portion 3 of the rail 1. Secured to the upward face of the horizontally extending leg of the base 14 is an upwardly extending resilient block of insulating material such as rubber. The block is secured to the L-shaped base member 14 in any suitable manner such as vulcanizing. The rubber block extends upwardly a sufficient distance to seat firmly against the upper surface of the opening 6 or the lower surface of the upper portion 2. Located within the rubber block of the circuit controller 12 are two resistance strain gages 16 and 17 (see FIG. 2). The strain gages 16 and 17 are of any suitable type well known in the art, one example of which is shown in FIG. 7 on pages 8–49 of Kent's Mechanical Engineers' Handbook, Design and Production Volume, Twelfth Edition, published by John Wiley and Sons Inc., New York. The gauges have a relatively broad flat area in which, for example, wire grids are formed. As is well known, this type of gauge changes its electrical resistance due to changes in the dimension of the wire grids. The gauges are rectangular in shape and are positioned with their ends extending upwardly and downwardly toward the lower surface of the upper portion 2 and the base member 14. The strain gages 16 and 17 are also secured within the rubber block in any suitable manner, such as by molding. As will be appreciated gauges 16 and 17 will change their resistance due to changes in the dimension of the rubber block in planes parallel to the broad flat surface of the gauges.

Positioned within the opening 6 and adjacent to the circuit controller 12 is the second circuit controller 13. The additional circuit controller 13 comprises a base portion 18 provided with a downwardly extending lug 19 having openings for receiving bolts 20 for securing the additional circuit controller in place within the opening 6. With the downwardly extending lug 19 positioned adjacent to the intermediate portion 3 and secured in place by the bolts 20, the base 18 is seated firmly against the lower surface of the opening 6. Secured to the upper surface of the base portion 18 is a block 22 of resilient material such as rubber, which is secured to the base portion 18 by any suitable means such as vulcanizing. Secured to the resilient block 22 by any suitable means such as vulcanizing is a pressure block 23 which extends from the upper surface of the resilient block 22 to the lower surface of the upper portion 2 of the rail 1.

Figure 3:
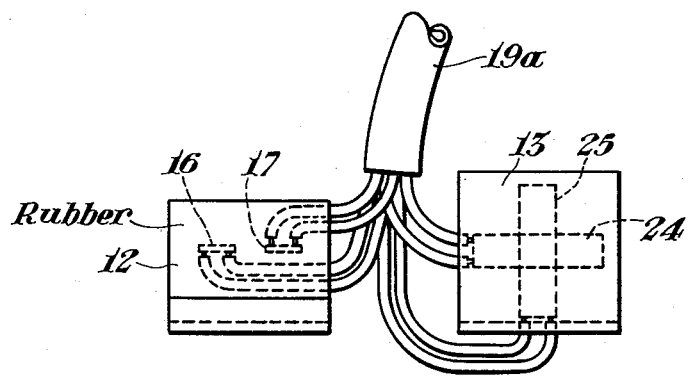
FIG. 3 is a plan view of our novel circuit controller removed from the rail to better illustrate the strain gage positions within the resilient rubber blocks.

Positioned within the resilient block 22 and at approximately along the horizontal center line plane of the resilient block 22 is a pair of strain gages 24 and 25. The strain gages 24 and 25 are positioned to extend horizontally within the block 22 and placed to form a cross (see FIG. 3).

With the two circuit controllers positioned within the opening 6, it can be seen that passage of a typical wheel 9 will cause the upper portion 2 of the rail 1 to deflect downwardly narrowing the opening 6. When this occurs, the rubber block of the circuit controller 12 is placed under compression and a shortening of the length of the strain gages 16 and 17 will occur causing the strain gages 16 and 17 to change resistance. At the same time the pressure block 23 is forced downwardly against the resilient member 22, causing the resilient member to change its configuration by expanding horizontally, placing the strain gages 24 and 25 under tension. Since the rubber block 22 is positioned between two comparatively noncompressible blocks and therefore is allowed to expand only in one plane it can be seen that the expansion of the rubber block 22 in this plane is greatly amplified, therefore causing an amplification of the tension placed on the strain gages 24 and 25.

If we consider the rubber block 22 as being of square cross section with a side equal to W and the block as having an original thickness or height $h$, and the block is compressed by an amount equal to $c$, the increase in the dimensions of the block would be an increment of the width or $\Delta W$. Assuming that rubber under compression flows like a liquid, a trend for the deformation of the block and therefore the amplification of the tension placed on the strain gages may be established. The volume of the rubber block 22 would be (1) $$V = W^2 h$$

Upon compression (2) $$V = (W + \Delta W)^2 (h - c) = W^2 h$$

(3) $$W + \Delta W = W \sqrt{\frac{h}{h-c}}$$

or (4) $$\Delta W = W \left( \sqrt{\frac{h}{h-c}} - 1 \right)$$

Since the rubber cannot fill out the corners of the block, it would appear that the deformation of the block is greater than that indicated by the formula (4) above. As an example of the amplification obtained by the use of a resilient member for enclosing the strain gage rosettes, a block of rubber 1.0 inch square and .125 inch thick used to enclose the strain gages will stretch more than .05 inch with a deflection of .012 inch of the railhead.

Figure 2:
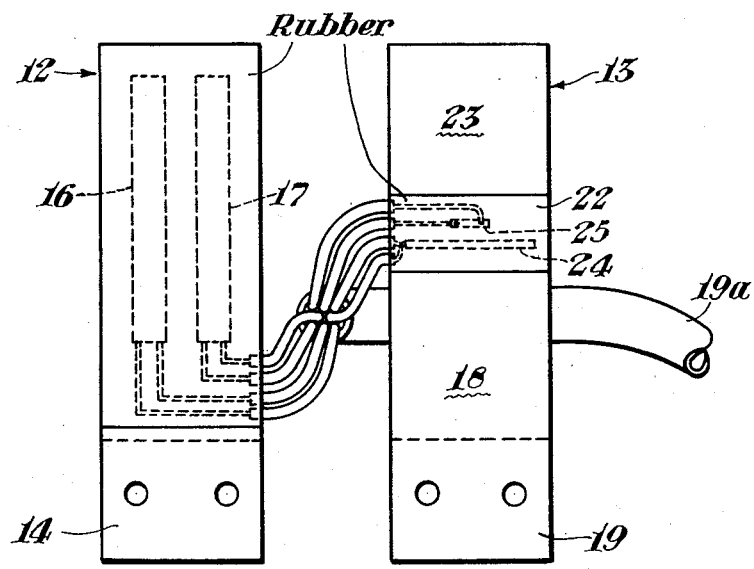
FIG. 2 is an enlarged elevational view of the strain gage circuit controller removed from the slot in the rail.
Figure 4:
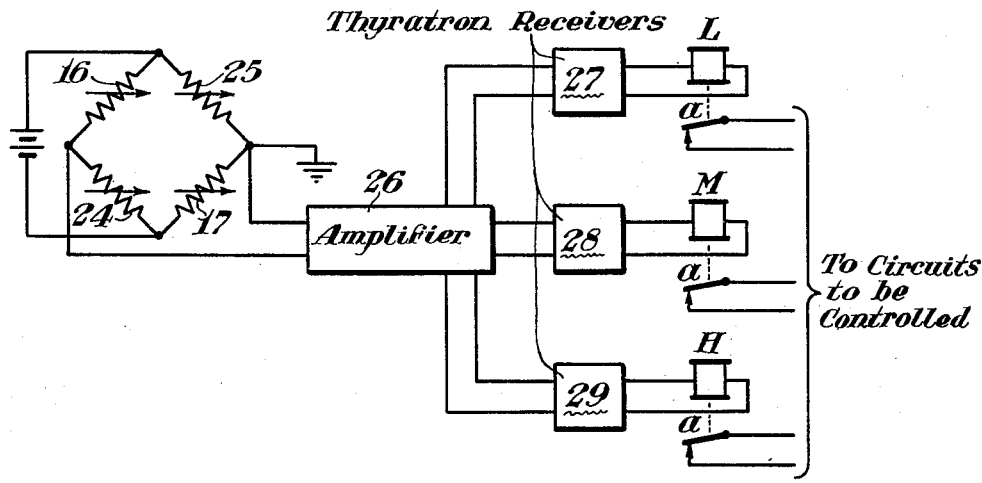
FIG. 4 is a diagrammatic view showing the circuit arrangement used with the circuit controlling device of FIG. 1.

The strain gages of the circuit controller shown in FIGS. 1 and 2 are connected into a Wheatstone bridge arrangement as shown in FIG. 4. The strain gages 16 and 17 are placed in opposite legs of the Wheatstone bridge and the strain gages 24 and 25 are placed in the other opposing legs of the Wheatstone bridge, therefore providing the greatest unbalance of the bridge due to changes in resistance of each of the strain gages. The detector circuit for the Wheatstone bridge comprises an amplifier, the output of which is connected to a plurality of thyratron receivers connected in parallel with each receiver having a relay associated therewith. The amplifier and thyratron receivers may be of any suitable well-known types with the particular circuit of each not being shown since it forms no part of our invention. The thyratron receivers, however, would be adjusted to different levels of response so that each of the relays L, M and H associated with the respective thyratron receivers would be energized at different levels of unbalance of the Wheatstone bridge.

For example, we will assume that the wheel 9 is a wheel associated with a light vehicle, therefore causing a load force to be applied to the upper portion 2 of the rail 1 so as to deflect the upper or first portion a small amount. Under these conditions the strain gages 16 and 17 are compressed a slight amount while the strain gages 24 and 25 are placed under a small amount of tension. When this occurs, the Wheatstone bridge formed by the strain gages 16, 17, 24 and 25 becomes slightly unbalanced and a small current flows in the detector circuit amplifier 26. The amplifier 26 amplifies the unbalance current and applies it to each of the thyratrons 27, 28 and 29. Since the loading of the wheel 9 is that of a light vehicle and the unbalance of the Wheatstone bridge is of small proportions, only the thyratron receiver 27 will receive sufficient energy from the amplifier 26 to conduct. Conduction of the thyratron receiver 27 places energy on the relay L and it is caused to attract its contact $a$, opening its control circuit. The response level of each of the thyratron receivers 28 and 29 is adjusted to be above the current flow in a detector circuit caused by the loading of the rail by a light vehicle. It can be seen, therefore, that no output current is delivered by the thyratron receivers 28 and 29 and the relays M and H remain deenergized. If the loading on the wheel 9 is that of a medium weight vehicle, the unbalance of the Wheatstone bridge would be greater and the current flow in the detector circuit to the amplifier 26 would also be greater. Under these conditions the thyratron receivers 27 and 28 would receive sufficient current from the detector circuit to cause conduction and current flow in their output circuits, causing the relays L and M to attract their contacts $a$. The response of the thyratron receiver 29, however, is of still higher level, therefore preventing any current flow in its output circuit. If the loading on the wheel 9 is increased and is that of a heavy vehicle, the maximum unbalance of the Wheatstone bridge would occur and maximum current flow would occur in the detector circuit and amplifier 26. The output of the amplifier 26 under these conditions would cause each of the thyratron receivers 27, 28 and 29 to conduct and supply current to their output circuits, energizing the relays L, M and H. Since the circuits controlled by the relays L, M and H are normally made over back contacts of each of the relays, it can be seen that the control circuits will be opened as the relays are energized and their movable contacts *a* are picked up.

Figure 5:
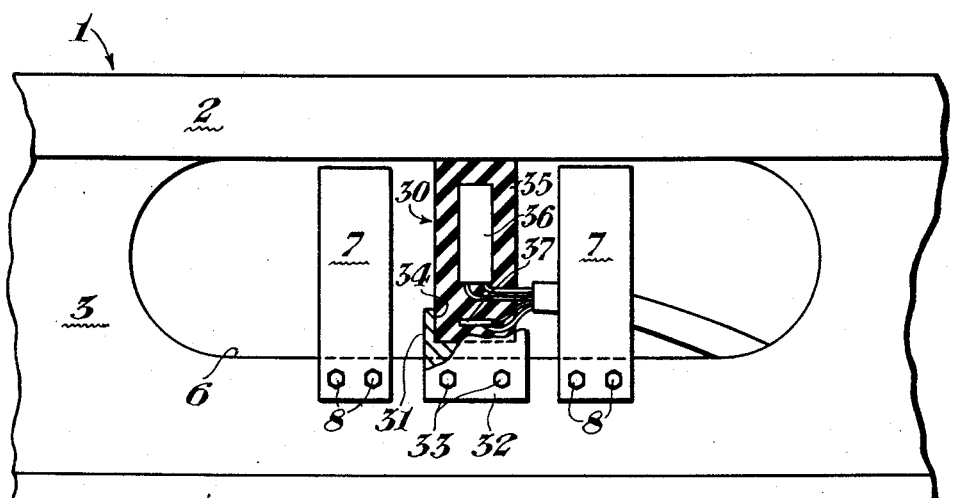
FIG. 5 is an elevated view of another embodiment of our circuit controlling device mounted in place in a rail opening in accordance with our invention and with certain parts sectioned to better show the structure.
Figure 6:
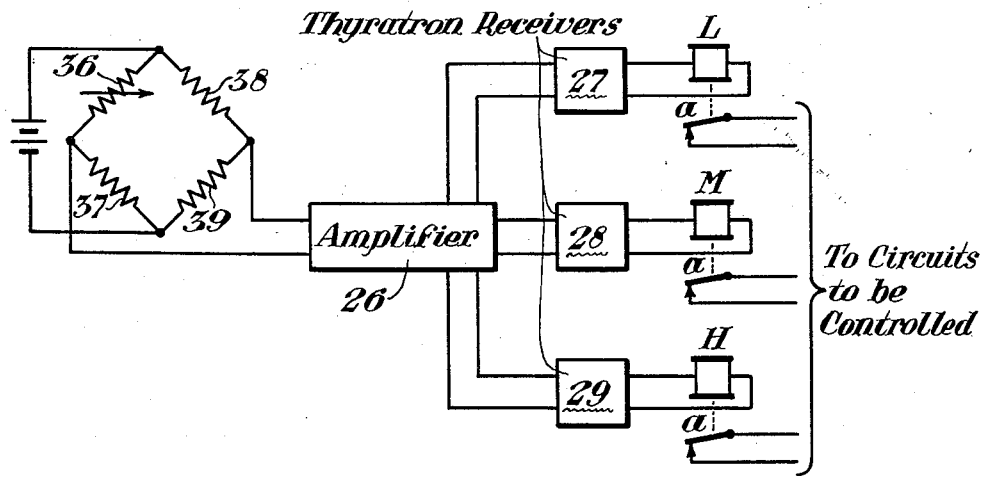
FIG. 6 is a diagrammatic view of the detector circuit used with the embodiment of the circuit controller shown in FIG. 5.

Another modification of our weight controlling device is shown in FIGS. 5 and 6. The circuit controlling device of FIG. 5 comprises a circuit controller 30 placed in the opening or slot 6 in the intermediate or second portion 3 of the rail 1. The opening 6 is provided with the usual stop members 7, as explained hereinbefore in connection with FIG. 1. The circuit controller 30 comprises a base portion 31 provided with a downwardly extending lug 32 provided with openings for securing the lug and base portion 31 to the intermediate portion 3 of the rail 1 as by the bolts 33. The base portion 31 is provided with an upwardly extending opening recess 34 for receiving a resilient block or member 35 which is of sufficient length to extend upwardly and into contact with the upper portion 2 of the rail 1. The resilient block 35 is provided with a pair of sensing means such as strain gage members 36 and 37 secured therein as by molding. The strain gage member 36 is positioned vertically within the resilient block 35 and in the area between the base portion 31 and the upper portion 2 of the rail 1. With this arrangement it can be seen that deflection of the first or upper portion 2 of the rail 1 downwardly against the resilient block 35 would place the strain gage 36 under compression and change the normal configuration of the block 35. The strain gage 37 is mounted in a position perpendicular to the strain gage 36 within the area of the resilient block 35 fitted in the recess 34. With the strain gage 37 so positioned it can be seen that upon application of a force, such a load to be weighed, to the first portion 2, deflection of the upper portion 2 of the rail 1 downwardly against the resilient block 35 will have no effect on the resistance of the strain gage 37 since it is in a portion of the block received within the recess 34 and therefore not subject to compression, or change in configuration. However, since the strain gage 37 is within the resilient block 35, it is subject to resistance changes due to temperature changes in the block 35.

The strain gages 36 and 37 are connected into a Wheatstone bridge arrangement with a pair of fixed resistances 38 and 39 which are remotely located. The variable strain gage 36 is placed in an opposing leg of the Wheatstone bridge to the resistance 39 while the strain gage 37 is placed in a leg opposing the fixed resistance 38. With this arrangement it can be seen that any temperature change affecting the resistances of the strain gages 36 and 37 would cause no change in the balance of the Wheatstone bridge. However, it can also be seen that deflection of the upper portion 2 of the rail 1 would cause a resistance change in the strain gage 36. This strain gage 36 change would in turn cause an unbalance of the Wheatstone bridge of FIG. 6. The detector circuit for the Wheatstone bridge of FIG. 6 is identical to the detector circuit explained hereinbefore in connection with FIG. 4 and contains the amplifier 26, thyratron receivers 27, 28 and 29 associated with the relays L, M and H, respectively.

Although we have herein shown and described only two forms of weight controlling means embodying our invention it is to be understood that various changes and modifications may be made therein within the scope of the appended claims without departing from the spirit and scope of our invention.

Having thus described our invention, what we claim is:

1. In combination with a load carrying member comprising, first, second and third portions, said second portion having an opening completely surrounded by the material of the member and extending transversely therethrough from side to side, the opening being located sufficiently close to the first portion to permit first portion deflection to cause a narrowing of the opening upon the application of a load force on the first portion, a resilient block positioned within said opening, a retaining member including a recess and mounted on a side of the opening in alignment with the direction of the load force, one end part of said resilient block being fitted in the recess in said retaining member, the recess preventing deformation of the fitted portion of the block when under load, the end of said block opposite said fitted part contacting the opposite side of the opening, said block being compressed in response to first portion deflection, first and second electrical resistance strain gauges mounted within said block, each of said gauges having a flat, sensitive area which changes its resistance when its configuration is changed, the first of said strain gauges being mounted in the block with its flat surface in a plane parallel to the direction of the load force, the second of said gauges being mounted in the portion of said block fitted within said recess with its flat surface in a plane perpendicular to the direction of the load force, said fitted portion of said block maintaining the configuration of said second gauge unchanged when the load force is applied.

2. In a weighing device which includes a member with first, second and third portions, the second portion having an opening completely surrounded by the material of the member and extending transversely therethrough from side to side, comprising the combination of a first means for mounting within the opening for changing its configuration responsive to narrowing of the opening upon application of a force to the first portion, a first sensing means positioned within the first means with a flat sensitive area in a plane parallel to the line of force and responsive to change of configuration of the first means for changing an electrical characteristic of said first sensing means, second means surrounding a part of the first means for maintaining the configuration of said part unchanged when a force is applied to the first portion, and a second sensing means mounted within the said part with a flat sensitive area in a plane perpendicular to the line of force for preventing change in electrical characteristic of said second sensing means when the opening is narrowed.

References Cited in the file of this patent

UNITED STATES PATENTS

| | | |
|---|---|---|
| 1,626,920 | Coleman | May 3, 1927 |
| 1,814,465 | Becq | July 14, 1931 |
| 2,414,161 | Moore | Jan. 14, 1947 |
| 2,558,563 | Janssen | June 26, 1951 |
| 2,582,886 | Ruge | Jan. 15, 1952 |
| 2,779,583 | Bone | Jan. 29, 1957 |
| 2,817,009 | Field | Dec. 17, 1957 |
| 2,906,865 | Jefferson | Sept. 29, 1959 |

FOREIGN PATENTS

| | | |
|---|---|---|
| 974,974 | France | Oct. 4, 1950 |
| 698,793 | Great Britain | Oct. 21, 1953 |